United States Patent [19]

Schelling et al.

[11] 4,384,251

[45] May 17, 1983

[54] PULSE-DUTY-CYCLE-TYPE EVALUATION CIRCUIT FOR A VARIABLE INDUCTANCE

[75] Inventors: Bernd Schelling, Stuttgart; Ulrich Flaig, Markgroningen, both of Fed. Rep. of Germany

[73] Assignee: Robert Bosch GmbH, Stuttgart, Fed. Rep. of Germany

[21] Appl. No.: 195,660

[22] Filed: Oct. 9, 1980

[30] Foreign Application Priority Data

Oct. 18, 1979 [DE] Fed. Rep. of Germany ....... 2942134

[51] Int. Cl.$^3$ .......................... G01B 7/14; B01D 5/20
[52] U.S. Cl. ...................................... 324/207; 324/59
[58] Field of Search ................. 324/207, 208, 67, 133, 324/345, 173, 174, 59; 340/551, 686; 73/722, 728

[56] References Cited

U.S. PATENT DOCUMENTS

| | | |
|---|---|---|
| 3,366,874 | 1/1968 | Kuhne ................................. 324/208 |
| 3,973,191 | 8/1976 | Zabler ................................. 324/207 |

FOREIGN PATENT DOCUMENTS

| | | |
|---|---|---|
| 2041553 | 3/1972 | Fed. Rep. of Germany ...... 324/207 |
| 2810144 | 9/1979 | Fed. Rep. of Germany ...... 324/207 |

*Primary Examiner*—Gerard R. Strecker
*Attorney, Agent, or Firm*—Frishauf, Holtz, Goodman & Woodward

[57] ABSTRACT

Repeated trigger pulses cause a comparator to put a transistor into its conducting condition, producing a rise in emitter-collector current dependent upon the inductance of a variable inductor. A voltage corresponding to this current is developed across a resistor in circuit with the inductor and is applied to the noninverting input of the comparator and when it reaches a threshold value, the comparitor switches and turns off a transistor, after which the reaction current in the inductor is dissipated through one or more resistors. The comparator output produces a step wave having a duty cycle proportional to the inductance value, a signal which is particularly useful when the inductor is a transducer producing an inductance that varies proportionately to a physical dimension or a pressure, particularly when these are operation parameters of an internal combustion engine.

5 Claims, 3 Drawing Figures

PULSE-DUTY-CYCLE-TYPE EVALUATION CIRCUIT FOR A VARIABLE INDUCTANCE

The invention concerns an evaluation circuit for an inductive transducer of which the inductance varies in accordance with a physical magnitude to be measured, particularly a magnitude that varies in operation of an internal combustion engine, such as the path traveled by a part of a positioning mechanism or control member, a pressure, or the position of a pedal.

Inductive transducers, especially those constructed with a displaceable short-circuiting ring, have the property that their inductance changes proportionally to the physical magnitude to be measured. It is, therefore, important that the evaluation circuit should deliver an evaluation signal which is proportional to the change of inductance. Circuits for this purpose have tended to be undesirably complicated or else insufficiently accurate.

SUMMARY OF THE INVENTION:

It is an object of the invention to provide a reliable and basically simple circuit for evaluating the change of inductance in an inductive transducer by providing a signal proportional to the inductance change.

Briefly, the inductance of the transducer is placed in the emitter-collector current circuit of a transistor as are also resistance-providing means (e.g. one or more resistors), and a comparator, which may be an operational amplifier, is provided having its noninverting input connected to the said resistance means and also connected to a feedback circuit branch interconnecting the noninverting input and the output of the comparator, the latter also having its inverting input connected with the tap of a voltage divider connected across the supply voltage and also with a diode across which periodic trigger signals are applicable.

It is particularly effective to provide a first capacitor and a diode in parallel therewith as components of the feedback circuit branch, and also in a circuit in which the emitter of the transistor is connected to one side of the supply voltage, to provide a second capacitor between that side of the supply voltage and the noninverting input of the comparator. It is also particularly desirable for the resistance means in the emitter-collector current circuit of the transistor to be made up of a charging resistance for determining the blocking time of the transistor and a supplementary resistance. The supplementary resistance may conveniently be connected to the collector of the transistor in the case that the emitter is connected to one side of the supply voltage as already mentioned, and for the charging resistor to be connected through another resistor to the noninverting input of the comparator. The output of the comparator provides a signal to the base of the transistor, preferably through a voltage divider, as well as providing an output signal for further processing.

The invention is further described by way of illustrative example with reference to the annexed drawings, in which.

Figure 1:
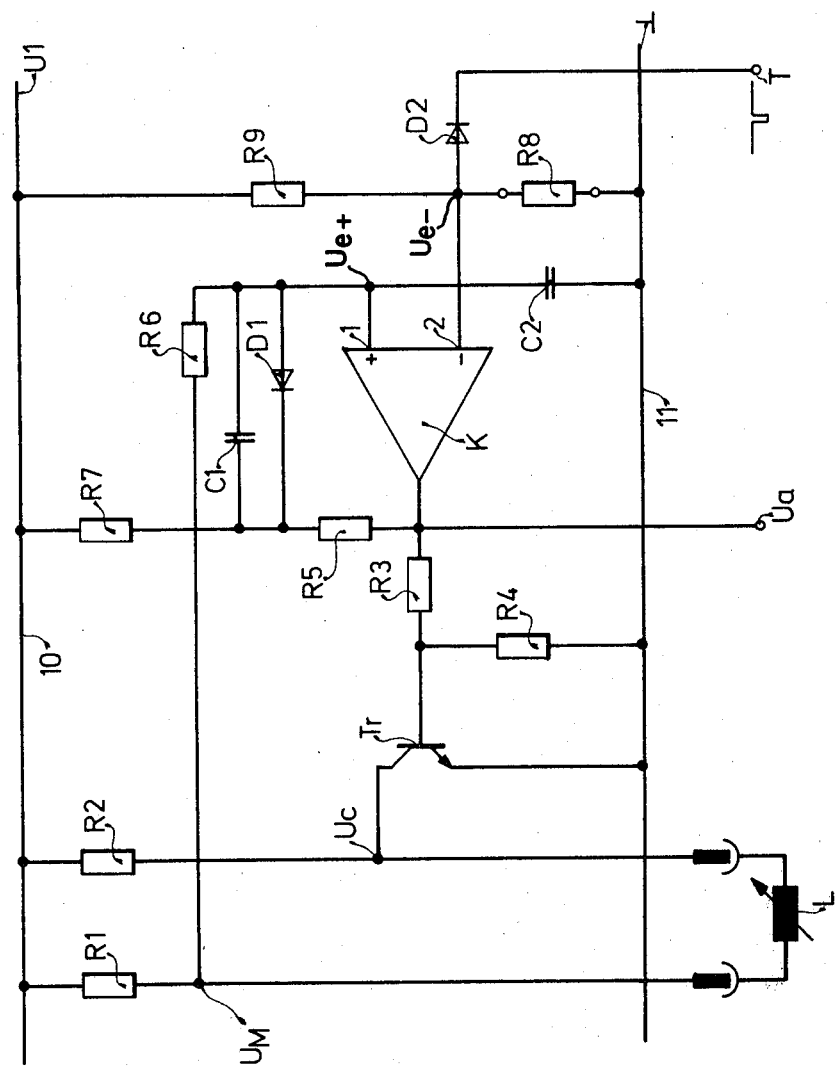
FIG. 1 is a circuit diagram of a preferred embodiment of the evaluation circuit.

DESCRIPTION OF THE ILLUSTRATED EMBODIMENTS:

The evaluation circuit of FIG. 1 includes as, principal components, a comparator K and a transistor Tr. In the emitter-collector current circuit of the latter, there is connected the coil of a variable inductance L, which varies as a physical magnitude to be measured varies, this coil being part of an otherwise not shown inductive transducer.

In the circuit shown in FIG. 1, the inductance L is connected through a resistor $R_1$ to the positive voltage bus 10, which supplies the operating voltage U1 to the circuit. The other end of the winding of the inductor is connected to the collector of the transistor Tr and to a resistance $R_2$, of which the other terminal, as in the case of the resistance $R_1$, is connected to the positive voltage bus 10. The emitter of the transistor Tr is connected directly to the negative supply voltage bus 11.

The base electrode of the transistor Tr is connected through a resistor $R_4$ with the negative supply voltage bus 11 and is also connected through a resistor $R_3$ with the output of the comparator K from which an output voltage Ua in the form of a rectangular wave is obtainable, the keying ratio (or duty cycle) of which depends on the value at the moment of the magnitude of the inductance L in a manner further described below. The positive, or noninverting, input 1 of the comparator is connected through a diode $D_1$ and a resistor $R_5$, which together form a feedback circuit branch, with the output of the comparator K and a capacitor $C_1$ is connected in parallel to the diode $D_1$, while a resistor $R_6$ is connected between the noninverting input 1 of the comparator and the common connection of the resistor $R_1$ and the inductor winding which has the inductance L.

The resistor $R_7$ is connected in series with the resistor $R_5$ and leads to the positive supply voltage bus 10. The second capacitor $C_2$ is connected between the noninverting input 1 of the comparator K and the supply voltage bus to which the emitter Tr is connected, which is, in this case, the negative bus 11.

The inverting or negative input 2 of the comparator K is connected to the common connection of two resistors $R_8$ and $R_9$, the series combination of which is connected across the supply voltage (i.e., between the positive and negative supply voltage busses 10,11). In FIG. 1, the negative supply voltage bus 11 is shown at the right to be connected to ground or reference potential.

At the trigger terminal T, which is connected through a second diode $D_2$ to the inverting input 2 of the comparator, a trigger pulse of the kind shown by the wave form shown in FIG. 1 next to the trigger terminal T can be applied, which periodically reappears and, for example, may be derived from the clock or synchronizing circuit of a microcomputer not shown in the drawing.

The manner of operation of the evaluation circuit can not be explained with reference to FIG. 2.

A measuring cycle is started with the negative-going flank of each trigger pulse T. The voltage Ua is produced at the output of the comparator and switches the transistor Tr into the current-conducting condition. The supply voltage $U_1$ is thereby applied to the inductor winding having the inductance L. The emitter-collector current of the transistor Tr then begins to flow in a circuit containing the inductance L. This current rises the faster, the smaller the inductance L. The voltage $U_m$ appearing at the connection of the inductor winding with the resistor $R_1$, which voltage is dependent upon the rate of rise of the current, is measured by the comparator through its noninverting input.

Figure 2:
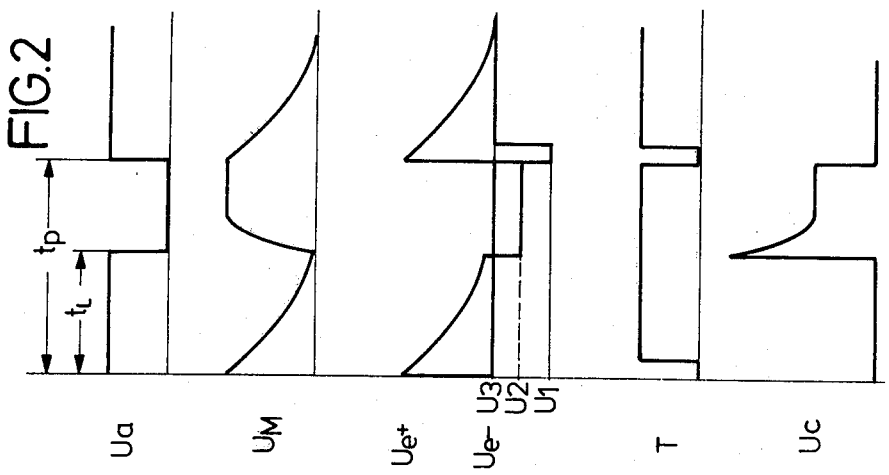
FIG. 2 is a timing diagram showing wave forms in various parts of the circuit of FIG. 1 during operation.

When the voltage $U_e+$ applied to the noninverting input of the comparator reaches the threshold value $U_3$ indicated in FIG. 2, the comparator K is switched over, causing the transistor Tr to go into its nonconducting or blocked condition. The comparator K is held in this condition by means of the diode $D_1$ and the feedback resistor $R_5$, so that the voltage $U_e+$ then holds at the voltage level $U_2$ as shown in FIG. 2. This condition of the comparator K continues until the next trigger pulse T comes through the diode $D_2$ and the comparator K is then switched so as to apply the voltage $U_a$ again to switch on the transistor Tr.

After the transistor Tr becomes blocked by the rise of $U_e+$ past at the threshold $U_3$ as above described, the current in the winding of the inductor continues to flow, through the resistors $R_1$ and $R_2$ until it has died down. The high voltage $U_c$ that thereby arises at the collector of the transistor Tr produces a rapid extinction of the compensating current flowing through the inductor as a result of the collapse of the magnetic field. When the latter current has been quenched, the circuit is ready for effective response to the next trigger pulse T.

Dependent upon the magnitude at the moment of the inductance L and the necessary current extinction time, the keying ratio of the comparator output signal $U_a$ is varied. This keying ratio is illustrated in FIG. 2 as the ratio of the duration $t_L$ to the wave period $t_p$. Practically only the extinction time prevents the utilization of the entire cycle period $t_p$ for signal variation.

If the comparator output voltage $U_a$ is supplied to a low-pass filter, there results a filtered DC voltage which is proportional to the ratio of $t/t_p \sim L$ since the cycle period $t_p$ of the trigger pulses T is constant.

Figure 3:
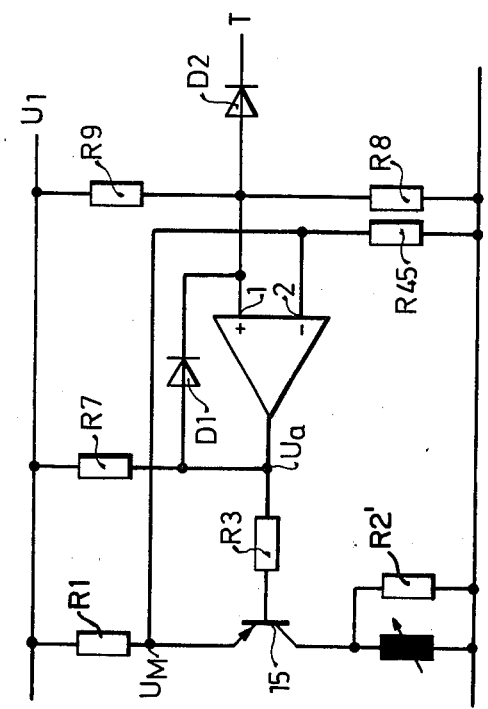
FIG. 3 is an embodiment of an evaluation circuit according to the invention using a transistor of a type complementary to the type of transistor shown in FIG. 1, which makes possible grounding one terminal of the variable inductance.

FIG. 3 shows a second embodiment of the evaluation circuit according to the invention, in this case using the pnp transistor 15 instead of an npn transistor such as is used in FIG. 1. This circuit operates in a manner similar to that of FIG. 1, but has the advantage that one end of the transducer winding of the variable inductor L can be grounded, which means that one transducer connection can be saved, for example, in an installation of the evaluation circuit in a motor vehicle.

The resistor $R_{45}$ of FIG. 3 combines the functions of the resistors $R_4$ and $R_5$ of FIG. 1. $R_{21}$ corresponds to $R_2$ of FIG. 1. The capacitor $C_2$ of FIG. 1 is not necessary in the case of FIG. 3 to provide an AC connection between the noninverting input 1 and the emitter of the transistor and this results in the resistor $R_6$ becoming unnecessary, as well as the capacitor $C_1$.

Although the invention has been described with reference to a particular illustrative embodiment, it will be understood that modifications and variations are possible within the inventive concept.

We claim:

1. Evaluation circuit for an inductive transducer of which the inductance varies with a physical magnitude to be measured, such as length of path traveled, pressure, or position of a pedal, comprising, in addition to said transducer:

a transistor (Tr) having emitter, collectors and base electrodes and having the inductance (L) of said transducer connected in series with the emitter-collector path of said transistor and with a voltage source in such a manner as to carry at least a part of the current passing through said emitter-collector path while the remainder of said current, if any, does not pass through any element having an electrical reactance;

resistance providing means ($R_1$) interposed in series with said emitter-collector current path of said transistor, said inductance (L) and said voltage source;

a comparator (K) having a first input (1) connected to said resistance means and to said voltage source so as to obtain therefrom a voltage derived from the variation of the current through said resistance means, and a second input connected with the tap of a voltage divider ($R_8 R_9$) connected across the output of said voltage source and having an output connected to one of said inputs thereof through a feedback circuit branch comprising a first diode ($D_1$), said last-mentioned comparator input being a noninverting input, said output of said comparator being also connected for providing alternating voltage step waves to said base electrode of said transistor, and a second diode ($D_2$) connected between said second input of said comparator and a source of periodic trigger signals (T), whereby trigger signals from said source produce voltage waves at said output of said comparator of which the duty cycle corresponds to the magnitude of said inductance.

2. Evaluation circuit as defined in claim 1, in which said emitter of said transistor (Tr) is connected to a first terminal of said voltage source, said noninverting input of said comparator is said first input thereof, said feedback circuit branch comprises a first capacitor ($C_1$) connected in parallel with said first diode ($D_1$), and in which the connection of said first input of said comparator to said voltage source is constituted by a second capacitor ($C_2$) connected between said noninverting input (1) of said comparator (K) and said first terminal of said voltage source.

3. Evaluation circuit as defined in claim 1, in which a supplementary resistance ($R_2, R_2,$) is connected between said emitter-collector path of said transistor and said voltage source so as to permit discharge of said transducer inductance when said transistor is nonconducting, and in which said resistance means ($R_1$) and supplementary resistance serve together with said inductance (L) as a timing network for the duration of blocked and unblocked conditions of said transistor within the periods of said trigger signals.

4. Evaluation circuit as defined in claim 2, in which the connection of said resistance means ($R_1$) to said first input (1) of said comparator (K) is provided through a third resistance ($R_6$) connected to the connection of said resistance means ($R_1$) with said inductance (L).

5. Evaluation circuit as defined in claim 4, in which a voltage divider ($R_3 R_4$) is interposed in said connection of the output of said comparator for providing step waves to said base electrode of said transistor, said voltage divider being connected between said comparator output and a terminal of said voltage source and having a tap connected to said base electrode.

* * * * *